United States Patent [19]
Belvederi

[11] Patent Number: 5,447,673
[45] Date of Patent: Sep. 5, 1995

[54] METHOD OF FASHIONING A RIGID PACKET WITH A HINGED LID TO CONTAIN ELONGATED ELEMENTS, IN PARTICULAR CIGARETTES

[75] Inventor: Bruno Belvederi, S. Martino di Monte S.Pietro, Italy

[73] Assignee: G. D S.p.A., Bologna, Italy

[21] Appl. No.: 205,388

[22] Filed: Mar. 4, 1994

[30] Foreign Application Priority Data

Mar. 5, 1993 [IT] Italy .............. BO93A0074

[51] Int. Cl.⁶ ............................................. B29C 45/37
[52] U.S. Cl. ...................... 264/238; 264/328.1; 206/256; 206/268
[58] Field of Search .............. 220/337, 339, 351; 493/911; 264/328.1, 328.12, 330, 238; 53/148; 206/256, 257, 268

[56] References Cited

U.S. PATENT DOCUMENTS

| | | | |
|---|---|---|---|
| 2,687,157 | 8/1954 | Cowan | 220/339 |
| 3,063,549 | 11/1962 | Weichselbaum | 220/339 |
| 3,595,433 | 7/1971 | Jones | 220/339 |
| 3,628,215 | 12/1971 | Everburg | 220/339 |
| 3,813,025 | 5/1974 | Solomon | 220/339 |
| 4,049,231 | 9/1977 | Lutz | 249/64 |
| 4,465,184 | 8/1984 | Bruce | 220/339 |
| 4,733,796 | 3/1988 | Halverstadt | 220/339 |
| 4,949,883 | 8/1990 | Dubach | 222/556 |
| 5,016,777 | 5/1991 | Marvin | 220/339 |
| 5,095,054 | 3/1992 | Lay et al. | 264/328.14 |

FOREIGN PATENT DOCUMENTS

| | | | |
|---|---|---|---|
| 262144 | 5/1968 | Austria | 220/31 S |
| 0242905 | 10/1987 | European Pat. Off. | |
| 0368828 | 5/1990 | European Pat. Off. | |
| 1273213 | 8/1961 | France | 220/339 |

*Primary Examiner*—Jill L. Heitbrink
*Attorney, Agent, or Firm*—Cushman Darby & Cushman

[57] ABSTRACT

A cigarette packet of the rigid type having a hinged lid is fashioned in a mold, composed of a bottom die and a top die which combine to create two distinct voids and a slender channel by which the voids are interconnected. A moldable material is directed between the bottom die and top die, filling the voids and the channel completely and resulting in the formation respectively of a container, a lid, and a hinge connecting the lid to the container.

9 Claims, 2 Drawing Sheets

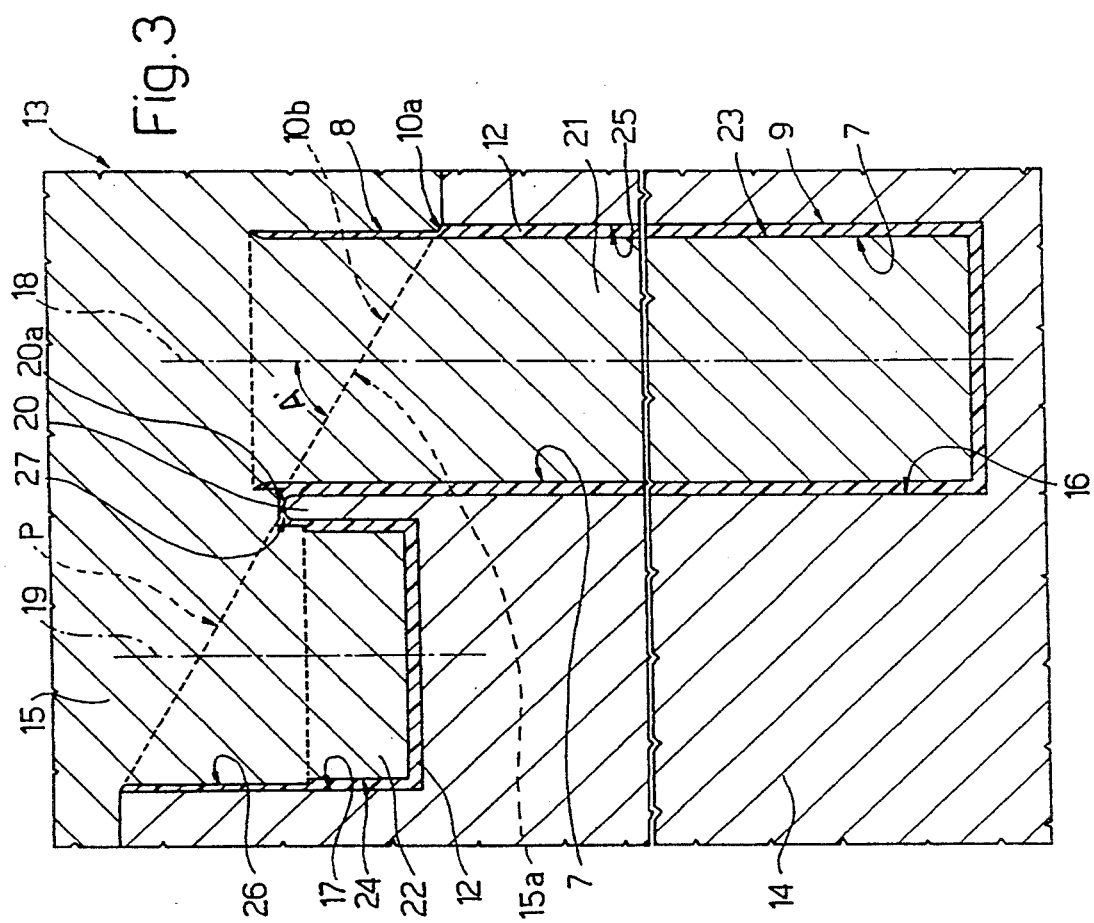

001
METHOD OF FASHIONING A RIGID PACKET WITH A HINGED LID TO CONTAIN ELONGATED ELEMENTS, IN PARTICULAR CIGARETTES

BACKGROUND OF THE INVENTION

The present invention relates to a method by which to fashion a rigid packet with a hinged lid for elongated elements, in particular cigarettes. Whilst reference is made hereinafter to a method of fashioning a rigid packet with hinged lid intended specifically to hold cigarettes, the scope of the invention is by no means limited to such a use. Cigarettes emerging from a manufacturing machine are typically ordered into groups and inserted into packets, each one of which is designed to accommodate a respective group. Each single packet is composed of a carton-like container at bottom, provided with a restraint or frame projecting beyond one open end or edge, a similarly carton-like lid uppermost, and, interposed between the container and the lid, a hinge on which the lid is able to rotate between positions in which the open end of the container is respectively exposed and concealed.

Conventional packets of the type described above are folded generally from respective flat cardboard die-cuts employing a cigarette packaging machine by which previously assembled groups of the cigarettes advancing in succession, each enveloped normally in a respective foil paper wrapping, are paired with corresponding frames bent into a U-shaped profile and fed thus to the face of a wrapping wheel along which a single die-cut is fashioned into a respective packet around each respective group of cigarettes. Naturally enough, the operation of fashioning the die-cut around the respective group of cigarettes involves the application of stresses to the group such as can result in damage to the cigarettes. Considering, moreover, that each packet is formed by folding and gumming a relative flat die-cut, it follows that the finished packets may well exhibit defects in appearance, such as parts that remain or come unstuck and/or deterioration of the cut edges exposed to view.

Given also that these familiar packets are composed of two or more wrapping layers disposed one inside another and fashioned from different materials of which certain are biodegradable only in part, the end-product is relatively expensive to manufacture, and furthermore, cannot be discarded freely in the environment without risk of pollution.

SUMMARY OF THE INVENTION

The object of the present invention is to provide a method whereby a rigid packet with a hinged lid can be fashioned simply and economically, without the drawbacks described above.

The stated object is fully realized in a method for fashioning a rigid packet with hinged lid serving to hold elongated elements, typically cigarettes, composed of a carton-like container, a similarly carton-like lid, and a hinge interposed between the container and the lid thereby allowing the lid to rotate between positions in which the container is open and shut, respectively.

The method according to the invention comprises the steps of preparing a bottom die embodied with a first cavity and a second cavity opening onto the same face of the die, disposed mutually adjacent and separated one from another by a web, of which the respective axes are disposed mutually parallel, also a matching top die affording at least a first core and a second core disposed mutually parallel and distanced one from another; offering the top die to the bottom die such that the first core and second core locate respectively in the first and second cavity, leaving a first and a second void, and in such a way that the web locates between the cores, creating a channel by which the first and second voids are interconnected; and introducing a moldable material between the bottom die and the top die in such a way as to fill the voids and the channel completely and thus fashion the container and the lid and the hinge, respectively.

In a preferred version of the method disclosed, the moldable material is a biodegradable material.

BRIEF DESCRIPTION OF THE DRAWINGS

The invention will now be described in detail, by way of example, with the aid of the accompanying drawings, in which:

FIG. 2 is a longitudinal section through the packet of FIG. 1, viewed in a closed configuration;

FIG. 3 is a sectional view of the packet of FIG. 1, viewed during a step of the method of its formation according to the invention;

DESCRIPTION OF THE PREFERRED EMBODIMENTS

Figure 1:
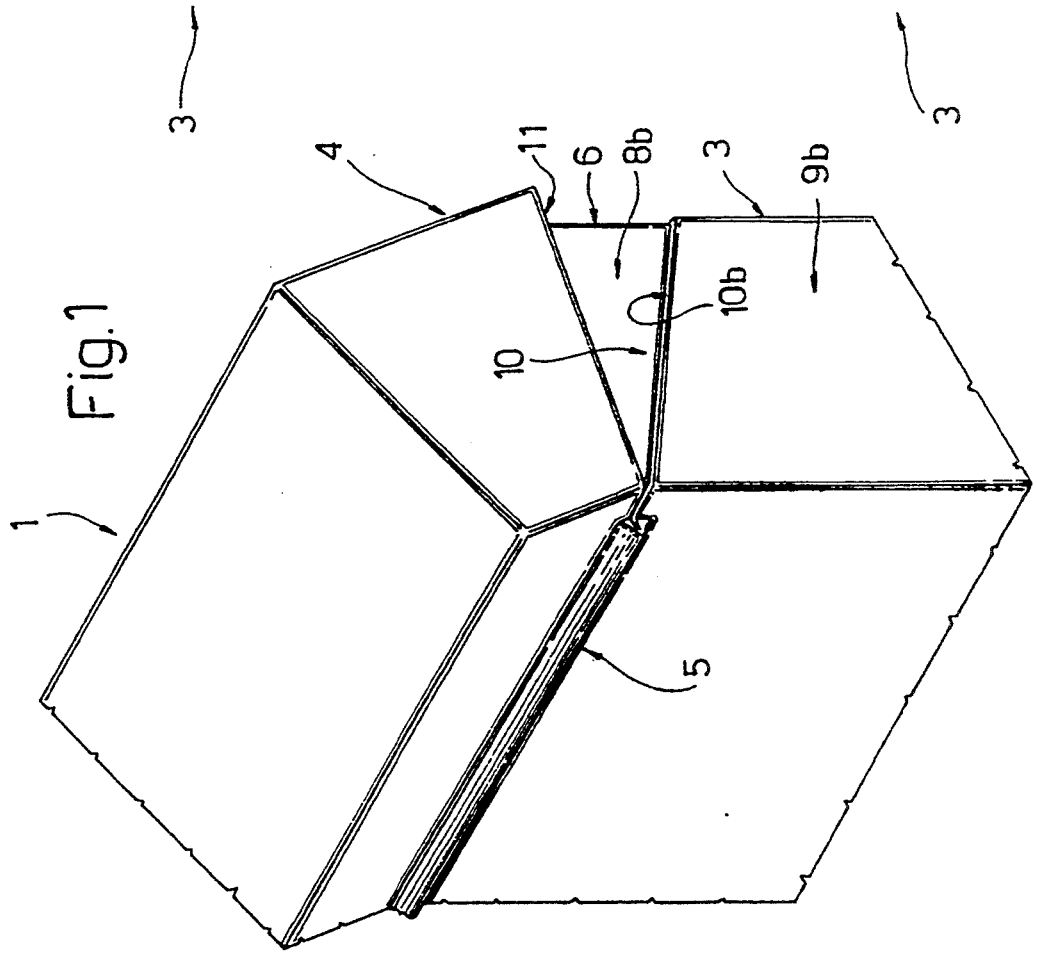
FIG. 1 illustrates a packet fashioned by the method according to the invention, viewed in perspective.

In FIGS. 1 and 2 of the drawings, the numeral 1 denotes a rigid packet designed to accommodate an ordered group of cigarettes 2, consisting basically in a carton-like container 3, at bottom, surmounted by a lid 4 also of carton-like embodiment. The lid 4 is associated pivotably with a rear edge of the container 3 by way of a hinge 5 and able thus to rotate between an open position, and a closed position in which the lid 4 itself encompasses a restraining element or frame 6 associated with the container 3.

The interior of the container 3 affords a plurality of flat surfaces 7, and the exterior a plurality of similarly flat first and second surfaces 8 and 9, of which the first surfaces 8 serve to establish the frame 6 and are set back toward the interior of the packet 1 in relation to the second surfaces 9. The second surfaces 9 comprise a front face 9a and two flank faces 9b (one only of which is visible) merging respectively with a front face 8a and with two second flank faces 8b (one only visible) of the frame 6 by way of stepped profiles 10 denoted 10a and 10b respectively, of which the latter (one only visible) are inclined at an angle denoted A (FIG. 2) in relation to the front face 9a. These profiles 10 combine to create a stop against which the edge 11 of the lid 4 locates when in the closed position. In the example of FIG. 3, the packet 1 illustrated is molded from a plastic material 12 or preferably a biodegradable material, such as cellulose, in a mold device 13 comprising a bottom die 14 and a matching top die 15 which meet substantially on an inclined plane denoted P (see phantom line).

The bottom die 14 comprises two cavities 16 and 17 positioned mutually adjacent and with respective openings directed toward the top die 15, of which the respective axes 18 and 19 are disposed parallel one with another, each forming an angle A' with the meeting plane P equal to the angle of inclination A aforementioned. The bottom die 14 also comprises a web 20 serving to separate the cavities 16 and 17, of which the portion directed toward the top die 15 exhibits a convexly rounded surface 20a.

Still referring to FIG. 3, the top die 15 comprises two appendages or cores 21 and 22 embodied with respective pluralities of flat lateral surfaces 23 and 24, insertable into the respective cavities 16 and 17 and accommodated with a degree of clearance in such a way as to create two respective voids 25 and 26 allowing the formation of the container 3 and the lid 4, respectively. The voids 25 and 26 are interconnected by way of a channel 27 created between the rounded surface 20a of the web 20 and an undercut surface 15a afforded by the top die 15, which allows the formation of a sliver of material providing the hinge 5.

In operation, the bottom die 14 and the top die 15 are matched along the meeting plane P in such a way as to position the cores 21 and 22 internally of the respective mold cavities 16 and 17 and thus define the voids 25 and 26 and the channel 27. The selected material 12 is then injected between the bottom die 14 and the top die 15, thereby filling the voids 25 and 26 and the channel 27 and forming the container 3, the lid 4 and the hinge 5.

Figure 4:
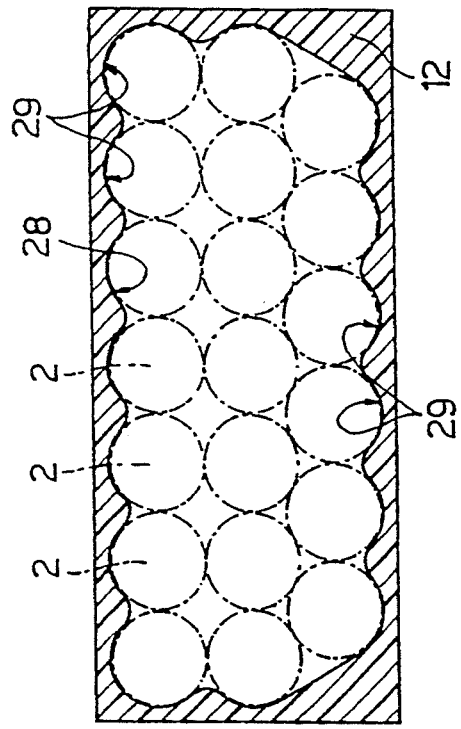
FIG. 4 shows a first alternative embodiment of the packet of FIG. 1, viewed in cross section.

In the alternative solution of FIG. 4, the appendage or core denoted 21 is not smooth, but embodied in such a manner that the interior of the container 3 will emerge with a fluted surface 28 affording a plurality of single longitudinal undulations 29, each presenting a cross-sectional profile of which the curvature is substantially the same as that of a cigarette 2.

Figure 5:
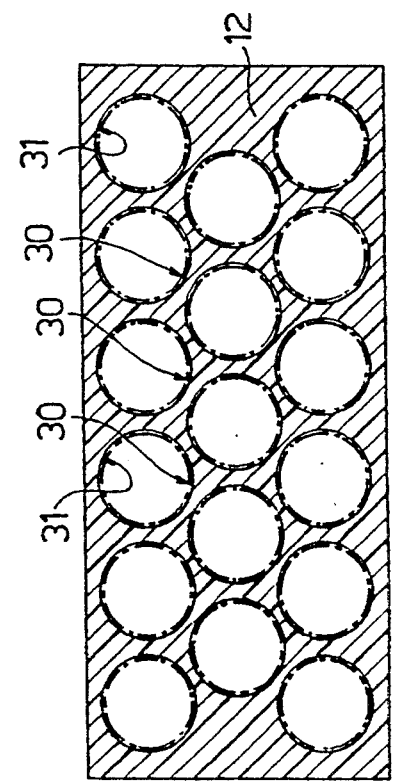
FIG. 5 shows a second alternative embodiment of the packet of FIG. 1, viewed in cross section.

In a further solution, suggested in FIG. 5, the same core 21 is embodied (in a manner not illustrated) as a plurality of axial appendages each reproducing the form of a single cigarette 2, in such a way as to fashion a container 3 affording a plurality of cylindrical sockets 30 lying mutually parallel and adjacent, each encompassed internally by a respective cylindrical surface 31 and of diameter marginally greater than the diameter of a single cigarette 2.

What is claimed:

1. A method for forming an integrally hinged, lidded box for a group of cylindrical rods which each have a same given length and a same given diameter, comprising:

providing a bottom die having a first face through which open a first cavity means and a second cavity means which are disposed spacedly adjacent one another; the first and second cavity means being axially elongated along respective longitudinal axes which are parallel to one another; the first cavity means having peripheral surfaces arranged for defining exterior surfaces of a front, left flank, rear and right flank of a body of said box, an exterior surface of a bottom of said box body, and an upper perimetrical edge for said box body; the second cavity means having peripheral surfaces arranged for defining exterior surfaces of a front, left flank, rear and right flank of a lid of said box, an exterior surface of a top of said box lid, and a lower perimetrical edge for said box lid; said peripheral surfaces of said first cavity means having a plurality of cylindrically curved concave surface portions longitudinally aligned with said longitudinal axis of said first cavity means and spaced from one another widthwise of said first cavity means;

providing a top die having a second face from which protrude a first plug means and a second plug means which are disposed spacedly adjacent one another; the first and second plug means being axially elongated along respective longitudinal axes which are parallel to one another; the first plug means having peripheral surfaces arranged for defining interior surfaces of said front, left flank, rear and right flank of said box body, an interior surface of said bottom of said box body, said an upper perimetrical edge for said box body; the second plug means having peripheral surfaces arranged for defining interior surfaces of said front, left flank, rear and right flank of said box lid, an interior surface of said top of said box lid, and said lower perimetrical edge for said box lid;

introducing said first and second plug means respectively into said first and second cavity means until said first and second surfaces confrontingly abut one another, said longitudinal axis of said first plug means coincides with said longitudinal axis of said first cavity means, said longitudinal axis of said second plug means coincides with said longitudinal axis of said second cavity means, a first void is defined between said first cavity means and said first plug means, and a second cavity means is defined between said second cavity means and said second plug means; said peripheral surfaces of said first plug means having a plurality of cylindrically curved convex surface portions longitudinally aligned with said longitudinal axis of said first plug means and spaced from one another widthwise of said first plug means;

providing a groove in at least one of said first and second surfaces, extending between said first and second voids, and thereby joining said first and second voids by a channel;

filling said voids and said channel with a quantity of molding composition and permitting or causing said molding composition to harden to thereby form an integrally hinged, lidded box having cylindrically curved internal surfaces in said front and rear of said box body, aligned with said longitudinal axes;

withdrawing said top and bottom dies relatively apart;

removing said integrally hinged, lidded box from said dies;

filling said box body with said group of cylindrical rods so that corresponding exterior portions of sides of different ones of said cylindrical rods engage in each of said cylindrically curved internal surfaces in said front and rear of said box body, said concave surface portions being curved about larger radii than are said cylindrical rods; and closing said box by flexure of said hardened molding composition through approximately 180° about an axis transverse to said longitudinal axes, in an integral hinge portion molded by said channel, until said lower perimetrical edge of said box lid lies superjacent said upper perimetrical edge of said box body.

2. The method of claim 1, wherein:
said cylindrical rods are cigarettes.

3. The method of claim 1, wherein:
said molding composition comprises biodegradable material.

4. The method of claim 3, wherein:

said biodegradable material is cellulose.
5. The method of claim 1, wherein:
said molding composition is a plastics material.
6. The method of claim 1, wherein:
said first cavity means is constituted by a single first cavity having said cylindrically curved concave surface portions provided as respective series of undulations thereon; and said first plug means is constituted as a single first plug having said cylindrically curved convex surface portions provided as respective series of undulations thereon.
7. The method of claim 1, wherein:
said first cavity means are constituted by a plurality of cylindrical cavities; and said first plug means are constituted by a respective plurality of cylindrical plugs, whereby said cavities and plugs form of said molding composition individual cylindrical sockets in said box body for said cylindrical rods.
8. The method of claim 1, wherein:
said first and second surfaces, when confronting, extend at an oblique angle to said longitudinal axes.
9. The method of claim 1, wherein:
said first and second cavity means and said first and second plug means, as provided, are further configured to cause said first void to further include a three-sided frame-forming portion for integrally forming a frame as an integral axial extension of said left flank, front and right flank of the box body above an inner portion of said upper perimetrical edge of said box body, for telescopic reception into said box lid as said box is closed.

* * * * *